(12) United States Patent
Skifstrom

(10) Patent No.: US 11,224,798 B2
(45) Date of Patent: Jan. 18, 2022

(54) SKILLS GAME

(71) Applicant: Mattel, Inc., El Segundo, CA (US)

(72) Inventor: Eric Skifstrom, Manhattan Beach, CA (US)

(73) Assignee: Mattel, Inc., El Segundo, CA (US)

( * ) Notice: Subject to any disclaimer, the term of this patent is extended or adjusted under 35 U.S.C. 154(b) by 205 days.

(21) Appl. No.: 16/722,954

(22) Filed: Dec. 20, 2019

(65) Prior Publication Data

US 2020/0206604 A1 Jul. 2, 2020

Related U.S. Application Data

(60) Provisional application No. 62/785,310, filed on Dec. 27, 2018.

(51) Int. Cl.
| | |
|---|---|
| *A63F 9/24* | (2006.01) |
| *A63F 9/18* | (2006.01) |
| *G06F 3/0481* | (2013.01) |
| *G06F 3/0346* | (2013.01) |
| *G06F 3/0354* | (2013.01) |

(52) U.S. Cl.
CPC ............... *A63F 9/24* (2013.01); *A63F 9/183* (2013.01); *G06F 3/0346* (2013.01); *G06F 3/03545* (2013.01); *G06F 3/04815* (2013.01); *A63F 2009/186* (2013.01); *A63F 2009/246* (2013.01); *A63F 2009/2435* (2013.01)

(58) Field of Classification Search
USPC .................................................... 273/1, 146
See application file for complete search history.

(56) References Cited

U.S. PATENT DOCUMENTS

| | | | |
|---|---|---|---|
| 6,538,645 B1 | 3/2003 | Juang | |
| 7,097,532 B1 | 8/2006 | Rolicki | |
| 7,161,313 B2 | 1/2007 | Piepgras | |
| 7,878,905 B2 | 2/2011 | Weston | |
| 7,933,431 B2 | 4/2011 | Pryor | |
| 8,049,721 B2 | 11/2011 | Tagawa | |
| 8,188,878 B2 | 5/2012 | Pederson | |
| 8,684,784 B2 | 4/2014 | Schmidt | |
| 8,708,767 B2 | 4/2014 | Heller | |
| 8,747,224 B2 | 6/2014 | Miyazaki | |
| 9,028,326 B2 | 5/2015 | Miyazaki | |
| 9,527,001 B2 | 12/2016 | Richardson | |
| 9,734,796 B2 * | 8/2017 | Chen .......................... G06T 3/40 |
| 9,763,307 B2 | 9/2017 | Aliakseyeu | |

(Continued)

OTHER PUBLICATIONS

Wow! Stuff Collection Harry Potter's Light Painting Wand, Model No. WW-1024, Warner Bros., Manufactured by China Industries Ltd DBA Wow! Stuff, Release Date Nov. 5, 2018.

*Primary Examiner* — Pierre E Elisca
(74) *Attorney, Agent, or Firm* — Edell, Shapiro & Finnan, LLC

(57) ABSTRACT

A skills game includes at least a trackable drawing device and an electronic device. The trackable drawing device includes one or more illumination sources configured to illuminate an illumination area of the trackable drawing device. The electronic device is configured to track a location of the illumination area when the illumination area is illuminated a specific frequency by the one or more illumination sources. The electronic device also generates a drawing on a display of the electronic device based on tracking of the location.

20 Claims, 15 Drawing Sheets

(56) References Cited

U.S. PATENT DOCUMENTS

| | | |
|---|---|---|
| 9,916,496 B2 | 3/2018 | Vandonkelaar |
| 2003/0199325 A1 | 10/2003 | Wang |
| 2006/0033713 A1 | 2/2006 | Pryor |
| 2007/0098391 A1 | 5/2007 | Howard |
| 2010/0019686 A1* | 1/2010 | Gutierrez, Jr. .......... F21S 10/02 |
| | | 315/291 |
| 2011/0050720 A1 | 3/2011 | Carter |
| 2011/0119638 A1 | 5/2011 | Forutanpour |
| 2013/0157760 A1 | 6/2013 | Boudville |
| 2015/0258431 A1 | 9/2015 | Stafford |
| 2016/0018083 A1 | 1/2016 | Kelly |
| 2017/0116957 A1* | 4/2017 | Chen ........................ G09G 5/10 |
| 2017/0278484 A1* | 9/2017 | Chen .................... G02B 6/0075 |

\* cited by examiner

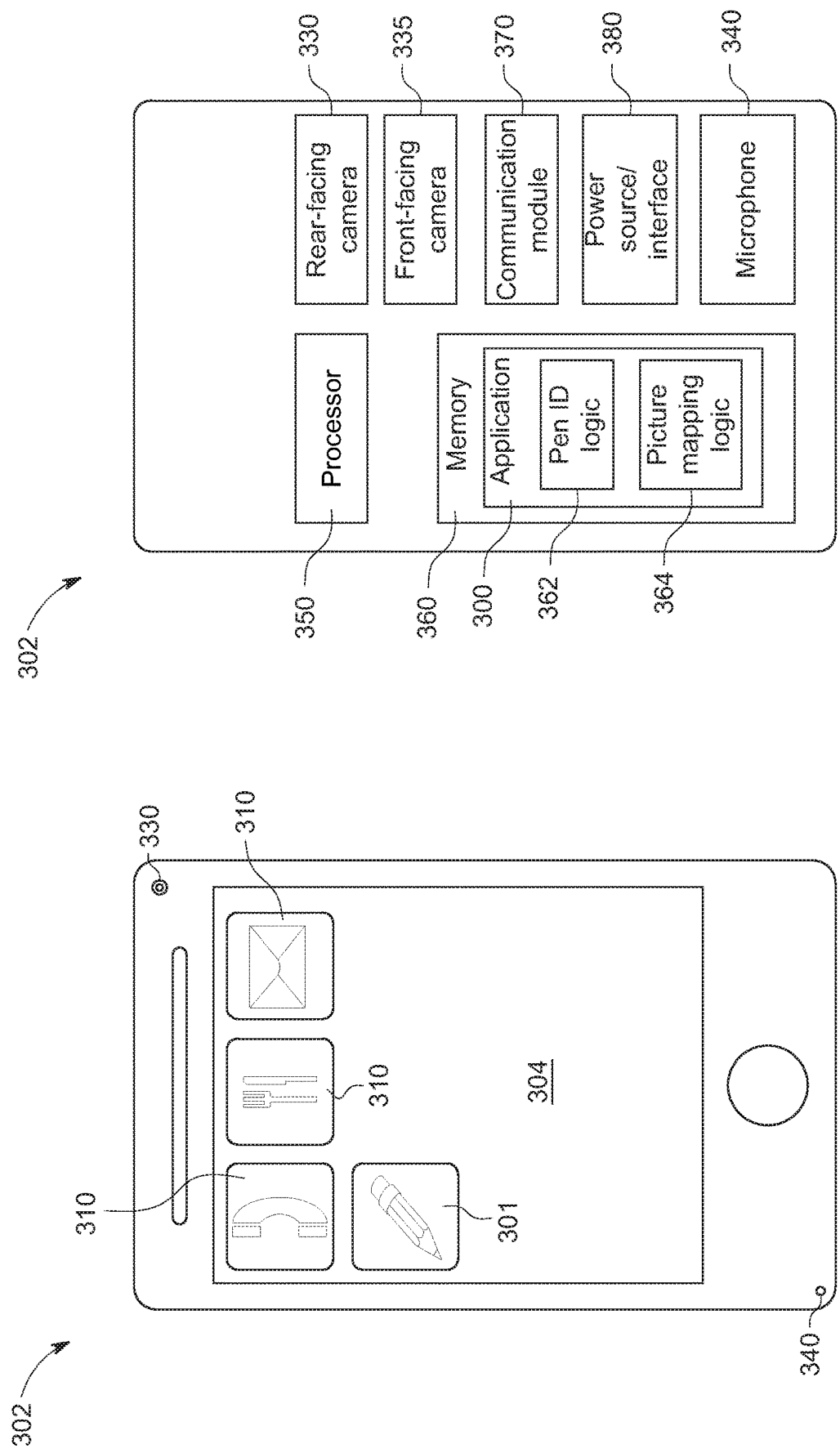

SKILLS GAME

CROSS-REFERENCE TO RELATED APPLICATION

This application claims the benefit of U.S. Provisional Patent Application No. 62/785,310, filed Dec. 27, 2018, entitled "Skills Game," the entire disclosure of which is incorporated by reference herein.

TECHNICAL FIELD

The present disclosure generally relates to a skills game. More specifically, the present disclosure relates to a skills game in which one game participant draws pictures and other game participants attempt to guess the subject of the pictures.

BACKGROUND

Skills games have been and continue to be an ample source of amusement for children and adults alike. Enhancements, features, and themes that provide continued engagement with a game and/or render a game easier to play add to a game's play value.

One game that is popular with both children and adults is PICTIONARY, which is currently produced and sold by MATTEL, of El Segundo, Calif. As a brief summary, PICTIONARY is a team-based game in which teams compete to correctly guess words printed on playing cards. Typically, during a team's turn, one player is selected as the artist (e.g., on a rotating basis) and the artist chooses a playing card with one or more words printed thereon. The artist then draws a picture of one particular word (e.g., based on a color-coding scheme that is synchronized with a game board) on a piece of paper, chalkboard, whiteboard, or other such drawing board/medium and the remaining members of his or her team try to guess the word based on the artist's drawing.

Thus, to play PICTIONARY, the game participants must either crowd around a small drawing board (e.g., sheets of paper) on which the artist is drawing or procure a large drawing board (e.g., a whiteboard, chalkboard, easel, etc.) that allows an artist to draw in front of a large group of guessing participants. Unfortunately, a small drawing board (e.g., sheets of paper) might limit the number of participants that can be included on a team and large drawing boards (e.g., whiteboards, chalkboards, easels, etc.) are not always readily available, especially considering the technological shifts away from these items in everyday life. In view of the foregoing, enhancements, features, and themes that provide continued engagement with and/or facilitate play of PICTIONARY or other such drawing games are desired.

SUMMARY

A skills game is presented herein. The skills game includes at least a trackable drawing device and an application that can operate on an electronic device, such as a smartphone or tablet. The trackable drawing device includes an active indicator that can be selectively activated, such as an illumination source that can be selectively activated to emit at least one specific frequency of light. The application includes logic that can recognize the active indicator and generate drawings on the display of the electronic device based on movements of the trackable drawing device. In at least some embodiments, the drawings overlay a real-time video feed captured by a camera included in the electronic device. Thus, for example, a first game participant may draw a picture in the air with the trackable drawing device and one or more other game participants may view the picture overlaid atop a real-time video feed of the first game participant on the display of one or more electronic devices. Thus, the skills game presented herein may allow users to play a modern version of PICTIONARY that incorporates electronic devices, such as smartphones, which are extremely prevalent in modern life, in place of a physical drawing board. In at least some embodiments, the skills game may also include a set of playing cards to help dictate gameplay.

According to one specific example, the present disclosure is directed to a skills game that includes a trackable drawing device and an electronic device. The trackable drawing device includes one or more illumination sources configured to emit at least light of at least a specific frequency. The electronic device is configured to track the location of the light emitted by the one or more illumination sources of the trackable drawing device when the light is emitted at the specific frequency. The electronic device also generates a drawing on a display of the electronic device based on tracking of the location.

BRIEF DESCRIPTION OF THE SEVERAL VIEWS OF THE DRAWINGS

The skills game presented herein may be better understood with reference to the following drawings and description. The elements in the figures are not necessarily to scale, emphasis instead being placed upon illustrating the principles of the skills game. In the figures, like-referenced numerals designate corresponding parts throughout the different views.

FIG. 6A is a diagram of an electronic device on which a game application included in the skills game of FIG. 1 may be implemented, according to an example embodiment.

FIG. 6B is a block diagram illustrating components of the electronic device of FIG. 6A.

DETAILED DESCRIPTION

Figure 1:
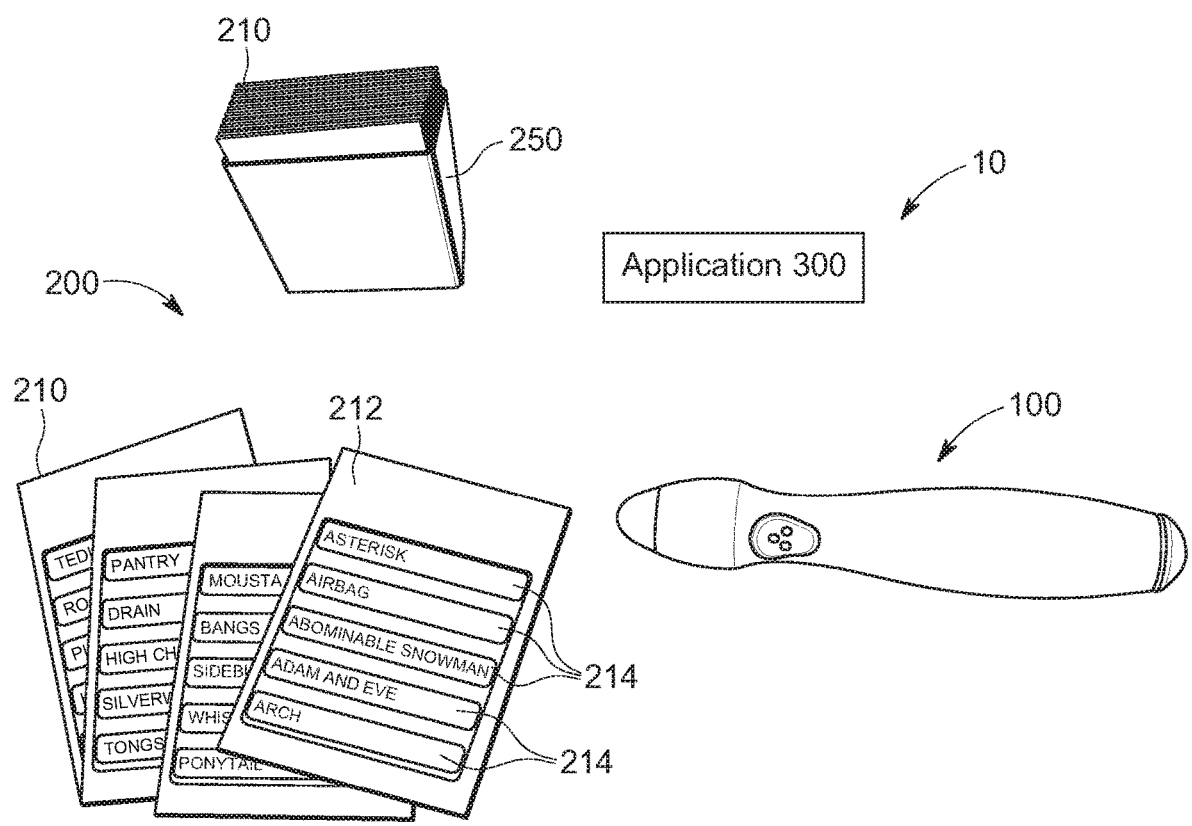
FIG. 1 is a diagram that illustrates a skills game according to an example embodiment of the present disclosure.
Figure 2:
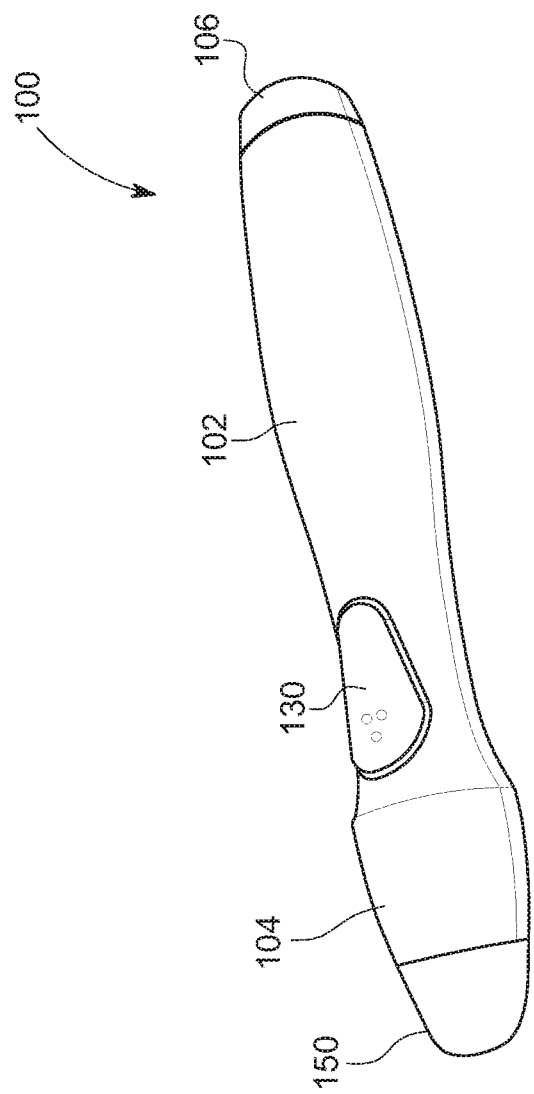
FIG. 2 is a top perspective view of a trackable drawing device included in the skills game of FIG. 1.

A skills game and, in particular, a skills game focused on drawing and guessing, is presented herein. The skills game includes at least a trackable drawing device and an application that is executed by (i.e., that is implemented on) an electronic device, such as smartphone and/or tablet. The trackable drawing device allows a user to draw a picture in the air and the application causes its host electronic device to create a viewable digital image of the air-drawn picture on a display of the electronic device, insofar as "in the air" is intended to mean that a picture can be drawn in space and need not be drawn on a surface. Put another way, the trackable drawing device allows a user to "air draw" or "draw in air," insofar as these terms or variations thereof are intended to mean that a user is creating a shape or picture without actually transferring a drawing material (e.g., wax, ink, paint, lead, etc.) to a drawing surface (e.g., paper).

In order to create the image, the application leverages a camera of the electronic device on which it is installed (i.e., its host electronic device) to capture images/video of a game participant who is "drawing" with the trackable drawing device. The captured images/video are then processed and/or analyzed by the host electronic device (in accordance with logic of the application) to track a location of the trackable drawing device. Based on the tracking, the host electronic device can create a viewable digital image/representation of the drawing drawn in air by the trackable drawing device. In at least some embodiments, the application causes its host electronic device to overlay the digital image/representation over a real-time feed from the camera. Consequently, game participants viewing an electronic device executing the application may feel like they are watching another game participant (the "artist") draw a picture on their electronic device. Put another way, in at least some embodiments, the application may generate digital drawings in augmented reality.

Advantageously, the skills game presented herein allows various drawing games, such as PICTIONARY, to be played without a drawing board (e.g., paper, a whiteboard, a chalkboard, etc.). That is, the skill game presented herein disentangles drawing games, such as PICTIONARY, from traditional drawing technology and allows game participants to play a modern version of drawing games with modern technology. This "modernization" may make it easier to play drawing-type skill games (e.g., since less physical equipment is required) and may also increase the appeal/engagement of the game (e.g., by adding features or twists to traditional games). Moreover, modern versions of vintage games are frequently appealing to end users, especially since end users now often prefer to play games on or involving their smartphones or tablets.

Now turning to FIG. 1, according to at least one embodiment, the skills game 10 presented herein (also referred to as game kit 10 or other variations thereof) includes at least a trackable drawing device 100 (also referred to as drawing device 100 and a game application 300. Although not shown, in some embodiments, the skills game 10 may also include a game board. Generally, the game application 300 includes logic that causes its host electronic device (i.e., the electronic device on which it is installed) to track the drawing device 100 and generate digital pictures/drawings based on movements of the drawing device 100. Consequently, a game participant who is acting as an "artist" can air draw with the drawing device 100 to create an image on a portable electronic device implementing game application 300.

To facilitate game play, the skills game may also include a set of cards 200 includes any number of cards 210 (e.g., one hundred and twelve cards 210) that each include a category 212 and clues 214 that relate to the card's category 212. For example, a card 210 may include the category 212 "starts with 'A'" and the clues 214 may be five words or phrases that start with the letter A, such as asterisk, airbag, abominable snowman, Adam and Eve, and arch. Each clue may be printed on a different background color. However, in some embodiments, the skills game 10 need not include physical cards and the game application 300 may display one or more digital cards to a particular participants when that participant is indicated to be the artist The skills game 10 will facilitate a variety of different gameplay/game mode options that are suitable for different numbers of game participants and/or different timeframes. For example, in at least one embodiment, skills game 10 will facilitate a "freestyle mode," a "blitz mode," a "classic mode," a "party mode," and a "showdown mode." The freestyle mode may allow one or more users to air draw with the drawing device 100 and view their own drawing on an electronic device that is implementing the game application 300. The other example game modes may involve the set of cards 200 (or digital versions thereof) in combination with time limits, point systems, and other gameplay features, at least some of which may be provided by an electronic device implementing the game application 300.

For example, in the blitz mode, two teams may take turns trying to guess as many clues 214 correctly as possible in a short time period, such as thirty seconds. More specifically, first one team may select a team member to act as the artist and "draw" with the trackable drawing device 100. The artist then selects a card 210 (e.g., by pulling the card from a holder 250), announces the category 212, and draws one of the clues 214 printed on the card 210 for their teammates.

Digital representations of the artist's "drawings" will appear on one or more electronic devices that are executing the game application 300 and being used by the artist's teammates (the non-artist participants may be referred to as guessing participants). Each time the artist's teammates correctly guess a clue 214, the artist draws the next clue 214 on their card 210. However, before the artist begins air drawing a second clue 214, his or her teammates can use the game application 300 to "erase" a user interface displaying the digital drawings and/or to indicate that the team correctly guessed a clue 214 based on the artist's drawing. Alternatively, in some embodiments, the application 300 may automatically recognize that the correct answer has been guessed (e.g., by processing audio captured by a microphone) and automatically erase the user interface to ready the user interface for a next clue.

Regardless of how a correct answer is recorded into the game application 300, the drawing and guessing cycle continues until the short time period expires or the guessing participants successfully guesses all of the clues 214 on the card 210. Then, the other team takes a turn and competes to correctly guess a higher number of clues than the first team within the time period (perhaps over a number of rounds). The game application 300 may also provide a timer and/or display a countdown so that teams know when the predetermined time period is expiring.

In classic mode or party mode, the gameplay will be similar to blitz mode, but now, teams will only try to guess one clue 214 during a predetermined period, without knowing the category 212. The game application 300 may indicate which clue 214 (e.g., of five) included on a card 210 an artist should draw, for example, by providing a color indication that corresponds to a background color provided behind one of the clues 214 on a card 210 or by emphasizing a particular clue on a digital card. As a specific example, a frame provided around a drawing display area generated by the game application 300 may appear as a specific color in order to indicate that the artist should select a clue 214 that is printed on/in that specific color.

In these modes, points are awarded for a correct guess and gameplay moves between teams if a time period expires or if a clue 214 is guessed correctly. Any number of teams may participate and the first team to reach a predetermined number of points (e.g., 10 points) may win the game. In classic mode, the game application 300 may cause an electronic device to display a digital representation of an artist's air drawings without any alterations. However, in party mode, the game application 300 may cause an electronic device to create digital representations of an artist's air drawings that are randomly altered/edited. For example, in some instances, the game application 300 may cause the lines in a digital representation of an artist's air drawings to bleed (e.g., become thicker) over time, appear inverted, distort (e.g., continuously bubble), and/or disappear over time.

Finally, in showdown mode, each team is given a set amount of time (e.g., five minutes) and tries to outlast the other team by preserving their time with correct guesses. More specifically, to start the game, a first team selects an artist who draws a card 210. The artist does not announce the category 212 and the game application 300 selects a clue 214 for the artist to draw (like classic mode and party mode). The first team's time starts as soon as the artist starts drawing and stops when the guessing participants on the artist's team correctly guess the clue 214 or a predetermined time limit has been reached. Then, the second team then repeats these steps. However, when it is again the first team's turn to play (e.g., after the second team correctly guesses a clue 214), the game application 300 will continue the timer from where it stopped at the end of the first team's first turn. For example, if two teams are each given five minutes and the first team takes twenty seconds to identify their first clue 214, the first team's timer will being at four minutes and forty seconds for their second turn. The last team with time remaining on their clock at the end of a round wins the game.

Now turning to FIGS. 2, 3A-3C, and 4, although the drawing device 100 is not usable to write or color, the drawing device 100 may resemble a pen, brush, or other such writing/coloring implement in size and shape. In particular, the drawing device may have a main body 102 that extends from a first end 104 to a second end 106. The first end 104 may define a front opening 105 sized to receive a translucent housing 150 and the second end 106 may define an opening 116 sized to receive an on/off button 120. In the depicted embodiment, the main body 102, the translucent housing 150, and the button 120 span an overall length L1 in the range of 100-200 mm, such as 167.5 mm.

Additionally, in the depicted embodiment, the main body 102 is ergonomic to provide a comfortable grip for a game participant acting as an artist. For example, the main body 102 may have a maximum back width W1 of approximately 27.5 mm (See FIG. 3A), a maximum front width W2 of approximately 25.2 mm (See FIG. 3A), and may include smooth curvature extending between the maximum widths W1 and W2 and away from each of the maximum widths W1 and W2 (towards the ends of the drawing device 100). Thus, the main body 102 may be largely concave and may define a button indentation 107 in which drawing button 130 can be mounted. Additionally, the main body 102 may be substantially cylindrical and, thus, for example, may have a maximum height H1 of approximately 28.2 mm (see FIG. 3C). However, in other embodiments, the drawing device 100 and/or the main body 102 may be any size and shape.

Figure 3A:
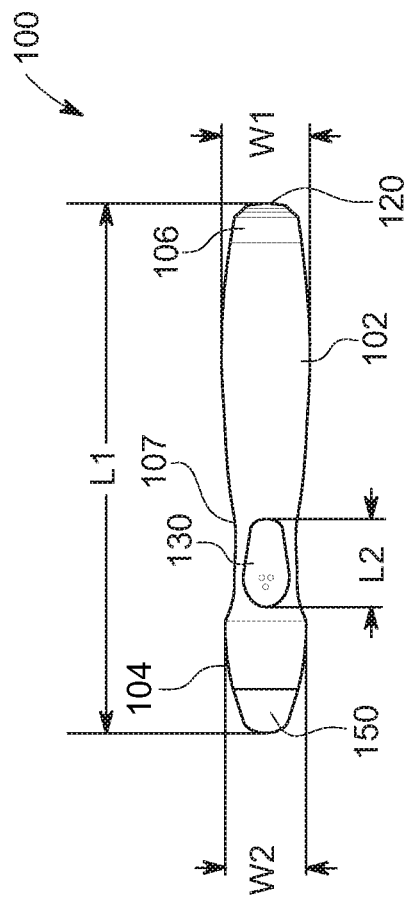
FIG. 3A is a top view of the trackable drawing device of FIG. 2.
Figure 3C:
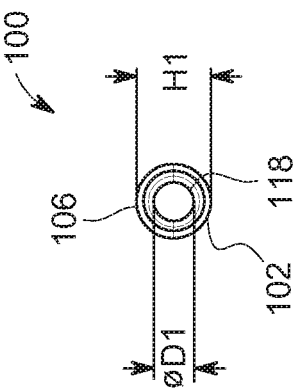
FIG. 3C is a back view of the trackable drawing device of FIG. 2.
Figure 3B:
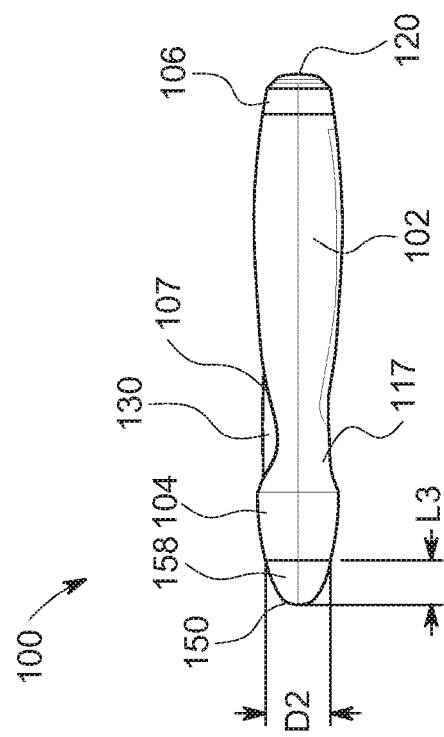
FIG. 3B is a side view of the trackable drawing device of FIG. 2.
Figure 4:
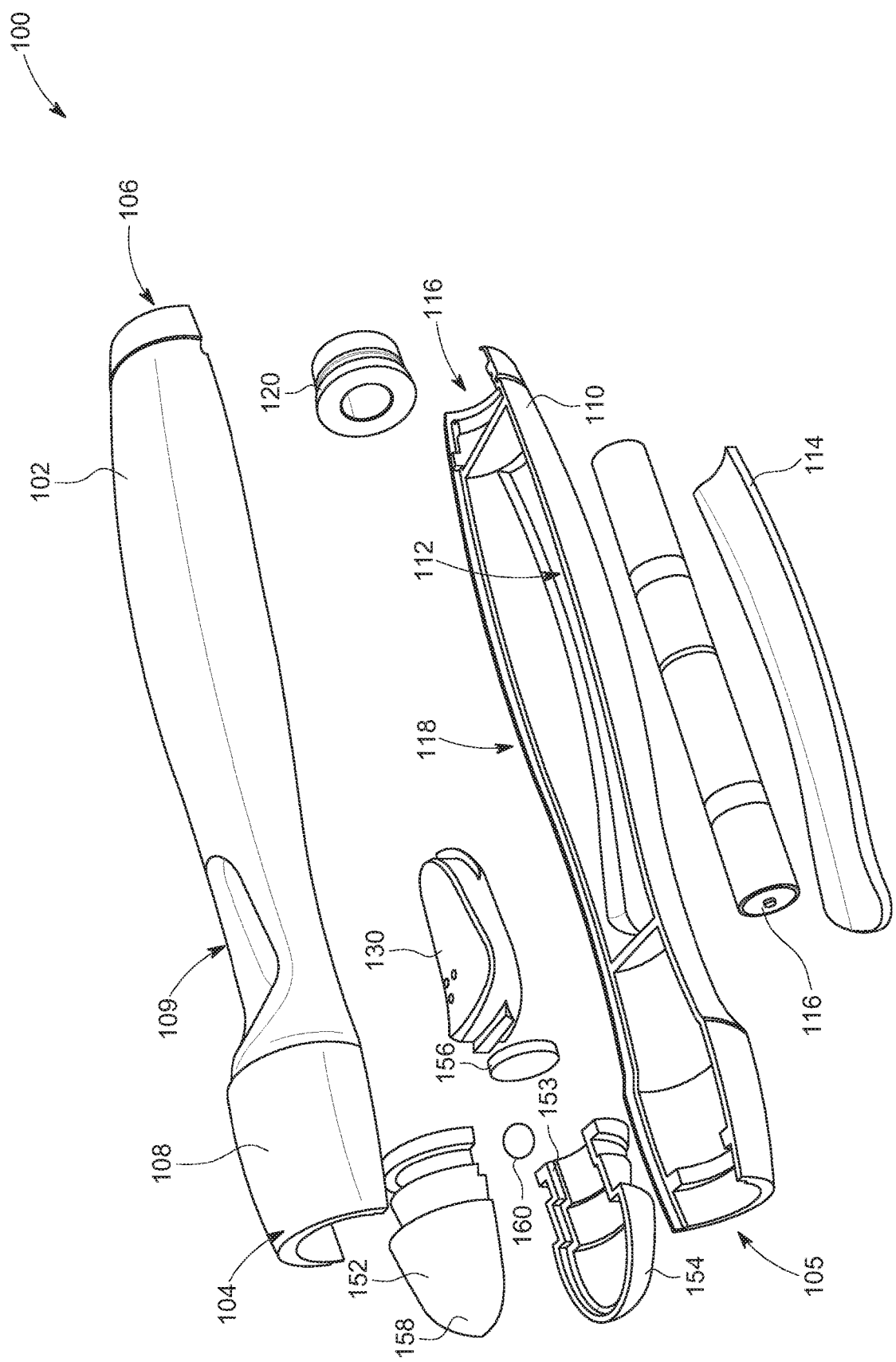
FIG. 4 is an exploded perspective view of the trackable drawing device of FIG. 2.

In the depicted embodiment, both the main body 102 and the translucent housing 150 are formed from two halves. In particular, and as is shown in FIG. 4, the main body 102 is formed from a top half 108 and a bottom half 110 and the translucent housing 150 is formed from a top half 152 and a bottom half 154. The top half 110 of the main body 102 defines the button indentation 107 and also defines an opening 109 in the indentation 107 that is sized to receive button 130. As is shown in FIG. 3A, the button 130 may have a length L2 that is a fraction of the overall length L1 of the drawing device 100, such as a length L2 of approximately 28 mm (e.g., about ⅙ of the overall length L1). The bottom half 110 also defines an indentation 117 that corresponds with indentation 107. When a user (e.g., an artist during gameplay) grips the drawing device 100, the user's thumb may naturally align with the button indentation 107 while the user's fingers wrap around the bottom indentation 117. However, again, in other embodiments, the main body 102 may have any size and shape and may be formed in any manner.

Together, the top half 108 and a bottom half 110 of the main body 102 may define an interior cavity 118 (see FIGS. 3C and 4) that is sized to receive one or more illumination sources 160, as well as any electronics that operate the one or more illumination sources 160. The interior cavity 118 may also define a battery compartment 112 and the bottom half 110 may include a battery cover 114 that can selectively cover the battery compartment 112 so that batteries 117 included in the drawing device 100 can be selectively replaced. As a specific example, the interior cavity 118 may have a diameter D1 of approximately 15.2 mm so that the interior cavity 118 can receive two AAA batteries 117.

Still referring to FIGS. 2, 3A-3C, and 4, the translucent housing 150 extends beyond the front end 104 of the main body 102 so that the translucent housing 150 defines an illumination area 158 that extends from the front end 104 of the main body 102. In the depicted embodiment, the illumination area 158 extends a length L3, such as approximately 14 mm, beyond the front 104 of the main body 102. Additionally, the illumination area 158 is substantially dome or frustoconically shaped; however, in other embodiments, the illumination area 158 can have any shape, such as a spherical shape. The illumination area 158 also spans the entire opening 105 included at the front end 104 of the main body 102. In the depicted embodiment, the front end 104 of the main body 102 converges or tapers from the maximum front width W2 and maximum height H1 so that the front opening 105 and a back end of the illumination area 158 have dimensions smaller than the maximum front width W2 and maximum height H1. For example, the illumination area 158 may have a substantially circular back end with a diameter of approximately 20 mm (while H1 and W2 may be 28.2 mm and 25.2 mm, respectively).

In the depicted embodiment, the translucent housing 150 also includes an engagement section 153 that is sized to couple the translucent housing 150 to the main body 102. The engagement section 153 is stepped to define a portion with a diameter that is larger than the diameter of the front opening 105. The illumination area 158 also has a diameter that is larger than the diameter of the front opening 105 and, thus, the engagement section 153 ensures that the translucent housing 150 cannot slide lengthwise with respect to the main body 102. However, in other embodiments, the translucent housing 150 may be secured to the main body 102 in any manner.

Now turning to FIG. 4 alone, regardless of the dimensions of the translucent housing 150 and/or the illumination area 158, an illumination source 160 may be included in or adjacent the housing 150 so that the illumination source 160 can selectively illuminate the illumination area 158. In the depicted embodiment, the illumination source 160 is disposed within the translucent housing 150 and a diffuser 156 extends across the translucent housing 150, between the illumination source 160 and the remainder of main body 102, so that the diffuser 156 can reflect light emitted by the illumination source 160 towards the illumination area 158 (if the light is traveling towards the main body 102). This may ensure that the illumination source 160 sufficiently lights the translucent housing 150 when the illumination source 160 is activated/actuated. However, in other embodiments, the diffuser 156 may be positioned between the illumination source 160 and the illumination area 158 and may be configured to filter or modulate light emitted by the illumination source 160 before it exits the translucent housing 150.

Either way, the illumination source 160 may include any elements or components that can emit light, such as one tri-color light emitted diodes (LED) or a combination of LEDs. Generally, the button 130 causes the illumination source 160 to emit light of a specific frequency. In some embodiments, the illumination source 160 is configured to emit light of a first frequency (e.g., red light) when the drawing device 100 is powered on (e.g., when button 120 is actuated) but drawing button 130 is unactuated. Then, when drawing device 100 is powered on (e.g., when button 120 is actuated) and drawing button 130 is actuated, the illumination source 160 emits light of a second frequency (e.g., green light). Alternatively, the illumination source 160 may only emit light (e.g., green light) when the button 130 is actuated (and not emit light until the button 130 is actuated), but the light may be light of a specific frequency. As is discussed in further detail below, by illuminating the housing 150 with light of a specific frequency (e.g., green light), the illumination source 160 may create an active indicator that is trackable by an electronic device executing the game application 300.

Figure 5A:
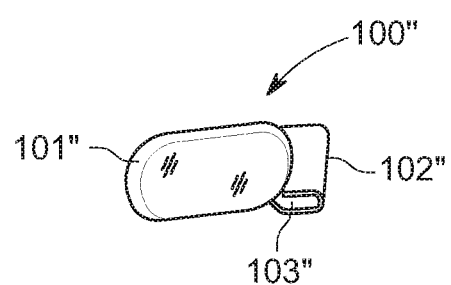
FIG. 5A is a perspective view of a filter that can be clipped onto an electronic device according to an example embodiment.

FIG. 5A is a perspective view of a filter that can be clipped onto an electronic device according to an example embodiment. In this embodiment, the filter 100" includes a colored, transparent portion 101" that is coupled to a clip 102" that defines a receiving region 103". The receiving region 103" is sized and configured to receive an edge of an electronic device to allow the transparent portion 101" to be positioned adjacent to the camera lens of the electronic device. In one implementation, the colored, transparent portion 101" filters certain colors out of the view of the camera of the electronic device to facilitate detection of the light emitted by the trackable drawing device during game play.

Figure 5B:
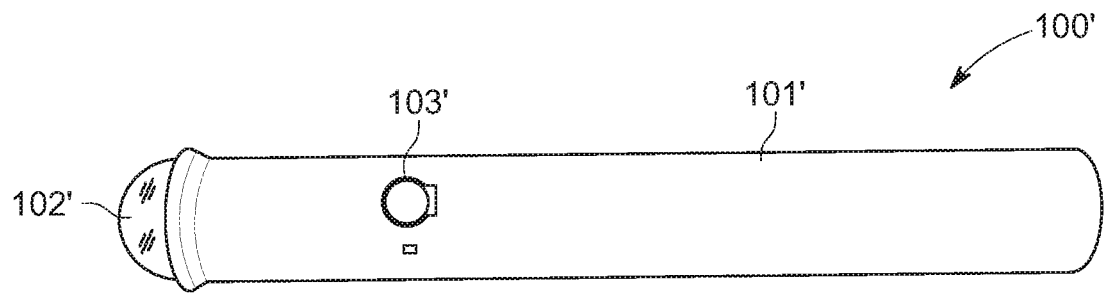
FIG. 5B is a perspective view of another embodiment of a trackable drawing device that can be included in the skills game of FIG. 1.

FIG. 5B is a perspective view of another embodiment of a trackable drawing device that can be included in the skills game of FIG. 1. In this embodiment, the trackable drawing device 100' includes a housing 101' with a translucent portion 102' through which light generated by an internal light source (not shown) can be emitted when a user activates the light source via button 103'. In this embodiment, the housing 101' has a different outer surface configuration than the housing of trackable drawing device 100.

FIGS. 6A and 6B illustrate an example electronic device 302 on which the game application 300 can be executed. FIG. 6A illustrates a front view of the electronic device 302 and FIG. 6B is a block diagram that illustrates components of the electronic device 302. As can be seen in FIG. 6A, in this particular embodiment, the electronic device 302 is a smartphone device (e.g., an iOS device, Android device, etc.), with applications ("apps") 310 for performing various functions on device 302. The electronic device 302 also includes the game application 300, which can be launched via game application icon 301, which may facilitate gameplay of the skills game 10. In FIG. 6A, icons representative of apps 310 and game application 300 are shown on a display 304 of the electronic device. Once a user opens game application 300, the application may provide a user interface on the display 304, as is discussed in further detail below.

In order to execute the game application 300, the electronic device 302 includes at least a front-facing camera 335. The front-facing camera 335 has a field of view (FOV) that extends away from a surface of the electronic device that is opposite the display 304 so that when a user is looking at the display, the FOV of the front-facing camera 335 extends in the same direction that the user is looking. In at least some embodiments, the front-facing camera 335 is included or embedded in the electronic device 302. For example, the front-facing camera 335 may be disposed on a back of the electronic device 302. However, in other embodiments, the front-facing camera 335 may be a separate camera that is operatively coupled to an electronic device (e.g., an add-on webcam). Either way, the front-facing camera 335 may be any camera now known or developed hereafter that is suitable for capturing images and video that the electronic device 302 can process in accordance with the techniques presented herein.

Since the front-facing camera 335 is often included on or attached to the rear of an electronic device 302, the front-facing camera 335 is not illustrated in FIG. 6A (which shows a front view of electronic device 302). Instead, FIG. 6A illustrates a rear-facing camera 330 and a microphone 340 that may optionally be included on an electronic device 302 executing game application 300. As is explained in further detail below, the front-facing camera 335 may be utilized to track a drawing device 100 and may also be utilized to generate a digital representation of an air drawing in augmented reality (i.e., overlaid atop of a real-time image/video feed). By comparison, the rear-facing camera 330 and microphone 340 may support ancillary/enhancement features, such as automatic recordation of a correct guess (e.g., based on audio data captured by microphone), post-game editing, reaction recording, etc.

As can be seen in FIG. 6B, at a high-level, the electronic device 302 may also include a processor 350, memory 360, a communication module 370, and a power source/interface 380 (in addition to the rear-facing camera 330, the front-facing camera 335, and the microphone 340). However, in other embodiments, an electronic device executing the game application 300 may include any combination of any desirable components. That is, the electronic device 302 may be any personal electronic device that is suitable for storing and executing game application 300, including portable electronic devices like smartphones, tablets, and laptops running a variety of operating systems (e.g., iOS, Android, etc.), as well as desktops or other computing device that require wired power. That being said, by way of example, the components shown in FIG. 6B are now briefly described.

First, memory 360 may include random access memory (RAM) or other dynamic storage devices (i.e., dynamic RAM (DRAM), static RAM (SRAM), and synchronous DRAM (SD RAM)), for storing information and instructions to be executed by processor 350. The memory 360 may also include a read only memory (ROM) or other static storage device (i.e., programmable ROM (PROM), erasable PROM (EPROM), and electrically erasable PROM (EEPROM)) for storing static information and instructions for the processor 350. Although not shown, the electronic device 302 may also include a bus or other communication mechanism for communicating information between the processor 350 and memory 360.

Next, although FIG. 6B shows the processor 350 as a single box, it should be understood that the processor 350 may represent a plurality of processing cores, each of which can perform separate processing. The processor 350 may also include special purpose logic devices (i.e., application specific integrated circuits (ASICs)) or configurable logic devices (i.e., simple programmable logic devices (SPLDs), complex programmable logic devices (CPLDs), and field programmable gate arrays (FPGAs)), that, in addition to microprocessors and digital signal processors may individually, or collectively, are types of processing circuitry.

The processor 350 performs a portion or all of the processing steps required to execute game application 300 in response to instructions received at communication module 370 and/or instructions contained in memory 360. Such instructions may be read into memory 360 from another computer readable medium. One or more processors in a multi-processing arrangement may also be employed to execute the sequences of instructions contained in memory 360. In alternative embodiments, hard-wired circuitry may be used in place of or in combination with software instructions. Thus, embodiments are not limited to any specific combination of hardware circuitry and software. Put another way, the electronic device 302 includes at least one computer readable medium or memory for holding instructions programmed according to the embodiments presented, for containing data structures, tables, records, or other data described herein.

Still further, the communication module 370 provides a two-way data communication coupling to a network, such as a local area network (LAN) or the Internet, and the power source/interface 380 provides power to any components included in the electronic device 302. The two-way data communication coupling provided by the communication module 370 can be wired or wireless. The power source/interface 380 can include a battery and/or components that convert external power into power suitable for the components of the electronic device (e.g., wired components that power a desktop computer).

Still referring to FIGS. 6A and 6B, generally, the game application 300 may cause (e.g., instruct) the electronic device 302 to identify a trackable drawing device 100, track movements of the trackable drawing device 100, and generate digital drawings representative of air drawings created with the trackable drawing device. For example, the game application 300 may cause the processor 350 to operate any combination of hardware components included in the electronic device (e.g., cameras 330 and 335 and/or microphone 340) and may also cause the processor 350 to execute instructions/logic to process data gathered by these components.

More specifically, in some embodiments, the game application 300 may include pen ID logic 362 and picture mapping logic 364 and the logic (e.g., pen ID logic 362 and picture mapping logic 364) may be stored in memory 360 and/or be accessible through the game application 300. For example, in some embodiments, the application logic (e.g., pen ID logic 362 and picture mapping logic 364) may be downloaded into memory 360 of the electronic device 302 when the game application 300 is installed on the electronic device 302. Alternatively, the game application 300 may include instructions that indicate the processor 350 should execute logic (e.g., pen ID logic 362 and picture mapping logic 364) stored remotely (e.g., in "the cloud").

Either way, when the game application 300 is launched/executed, the processor 350 (e.g., a microprocessor) may execute the application logic (e.g., pen ID logic 362 and picture mapping logic 364) in order to operate various components included therein or coupled thereto (including the front-facing camera 335 and display 304) and/or in order to carry out various analytical/processing operations. In the depicted embodiment, the processor 350 executes pen identification (ID) logic 362 to identify a trackable drawing device 100 in images/video captured by camera 335 and executes picture mapping logic 364 to track the trackable drawing device 100 and generate digital drawings. Notably, the electronic device executing the game application 300 is not physically, electrically, or operatively connected to the trackable drawing device. Instead, the game application 300 causes the electronic device 302 to identify and track the drawing device 100 based primarily on video processing/analysis.

For example, generally, pen ID logic 362 may specify that the drawing device 100 can be detected when a specific color or frequency of light, such as green light, is detected in the images/video captured by the front-facing camera 335. Thus, the pen ID logic 362 may cause the processor 350 to continually process ages/video captured by the front-facing camera 335 to search for a specific frequency of light (e.g., a specific color). Meanwhile, generally, the picture mapping logic 364 may cause the processor to generate digital drawings/markings on the display 304 based on movements of an active indicator (e.g., a specific frequency of light). In some embodiments, the picture mapping logic 364 may also cause the processor to display these markings/drawings on the display 304 atop of and positioned in sync with a live-feed from the front-facing camera 335 so that the digital drawings are presented in augmented reality.

Figure 7:
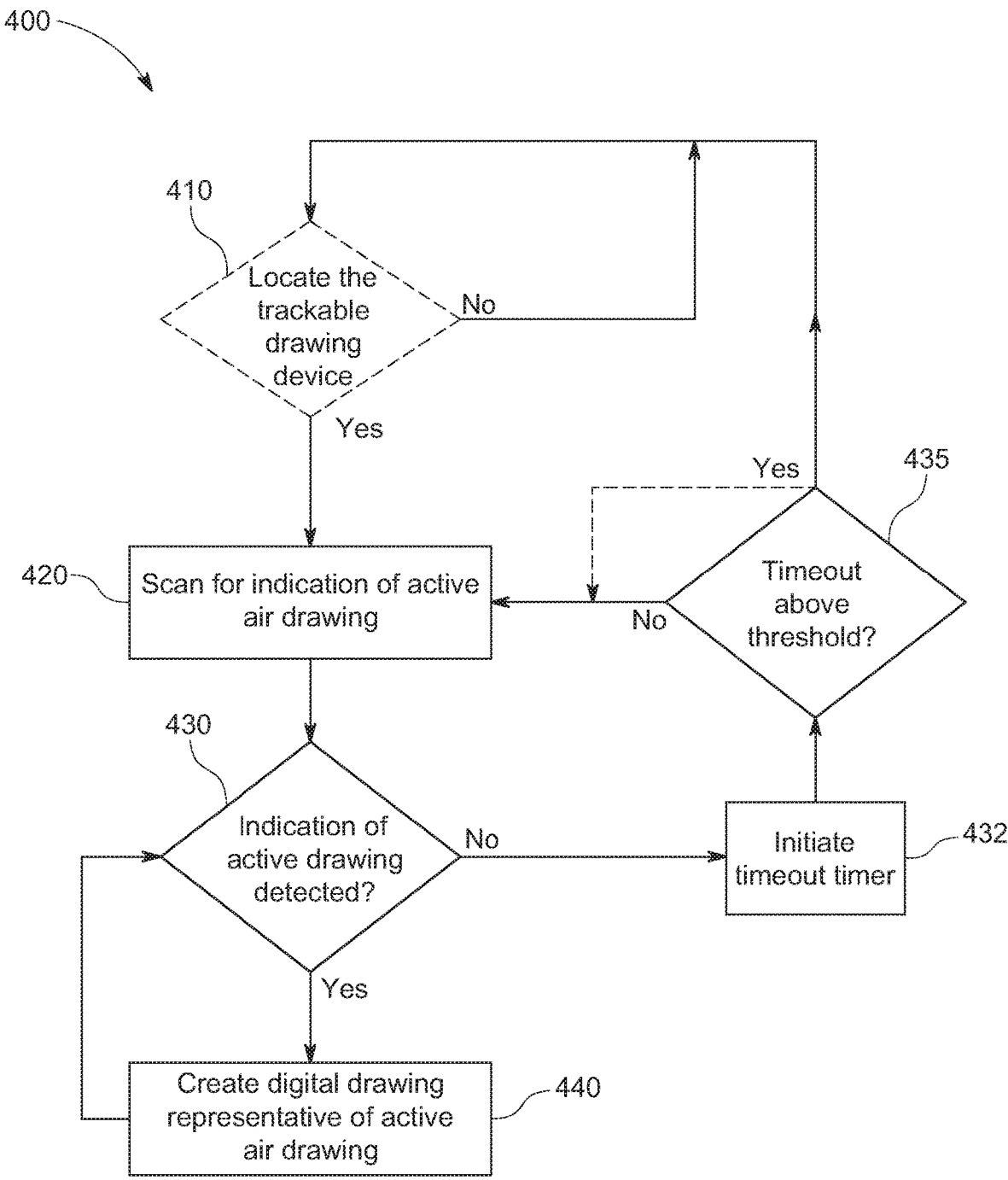
FIG. 7 is a high-level flowchart illustrating a method for generating drawings based on tracked movements of the trackable drawing device, according to an example embodiment. The application included in the skills game of FIG. 1 may be configured to cause an electronic device to execute the method.

Now turning to FIG. 7, this Figure illustrates a method 400 that the game application 300 (or more specifically the logic of game application 300) may cause an electronic device to execute during gameplay with skills game 10. Method 400 is described in connection with the electronic device 302 and drawing device 100 shown in the previously described Figures and is also described in connection with FIGS. 8-12, which depict participants and/or the electronic device 302 during various stages of gameplay with skills game 10. However, any references to specific item numbers from Figures other than FIG. 8 used to describe method 400 (such as 302) are merely examples and are not intended to limit the method 400 to execution on/with a specific device or in a specific environment. Moreover, although not shown, prior to initiation of gameplay, the game application 300 may cause the electronic device 302 to display one or more menus and/or home screens that allow a user to select a gameplay mode (e.g., between the game modes discussed above), input a number of teams, or otherwise interact with the game application 300 (e.g., to input data). In at least some embodiments, these menus/screens may also affect gameplay, for example, by providing an indication (e.g., a color indication) as to which clue 214 an artist should draw.

Figure 8:
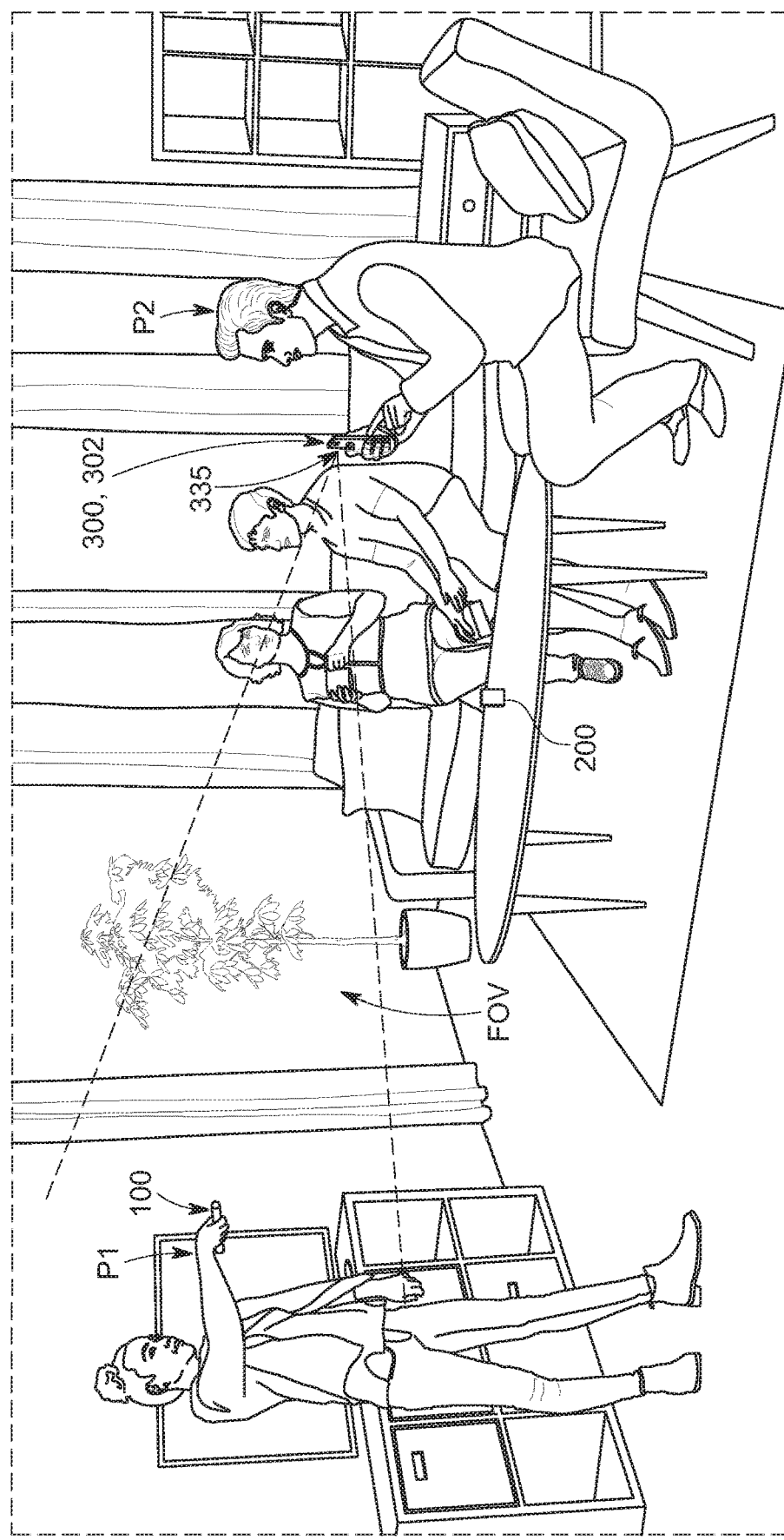
FIG. 8 is an illustration of game participants utilizing the trackable drawing device and game application of FIG. 1 to play the skills game of FIG. 1, according to an example embodiment.

That being said, in at least some embodiments, at the start of gameplay (and regardless of the mode) the game application 300 (or more specifically pen ID logic 362) causes the processor 350 of the electronic device 302 to process images captured by the front-facing camera 335 to attempt to locate the drawing device 100 (as shown at 410). That is, the pen ID logic 362 may leverage the front-facing camera 335 and the processor 350 of its host electronic device 302 in order to identify (i.e., initially locate) the trackable device 100 held by a first participant P1 in the FOV of the front-facing camera 335 included in the electronic device 302 (which may be held by a second game participant P2, as is shown in FIG. 8). In at least some embodiments, this is accomplished by processing images captured by the front-facing camera 335 to locate a specific frequency of light emitted by the illumination source 160 of the drawing device 100. As a specific example, in at least some embodiments, the processor 350 may determine that the trackable drawing device 100 has been located when it identifies a particular frequency of red light in an image/video captured by front-facing camera 335.

Figure 9:
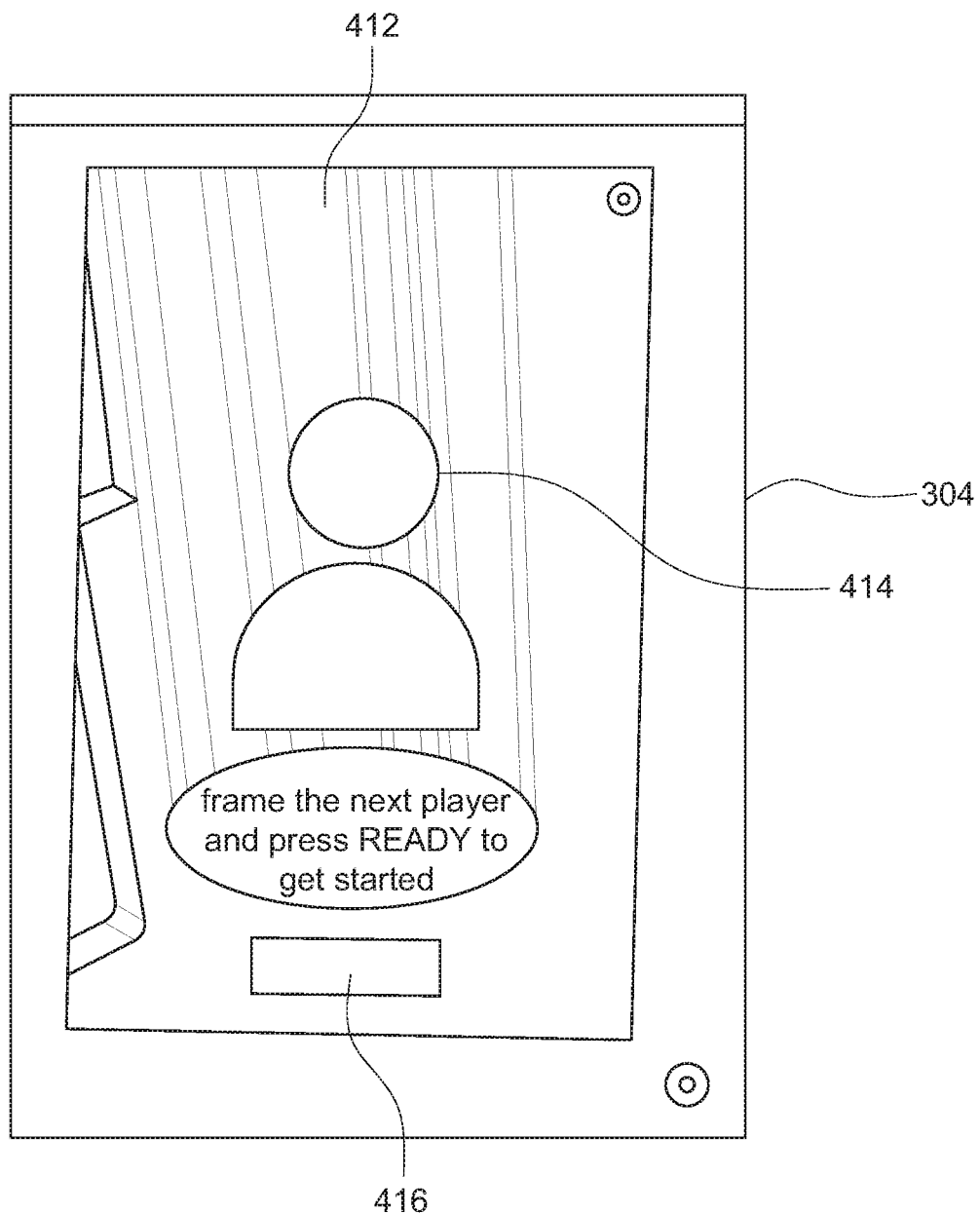
FIG. 9 is a diagram depicting an example user interface that the application may cause an electronic device to present to a game participant before and/or during execution of the method of FIG. 8.

In some embodiments, an electronic device 302 executing the game application 300 may begin searching for a specific frequency of light (e.g., red light) when the game application 300 is launched/opened and a gameplay mode is selected. Alternatively, in some embodiments, launching the game application 300 and/or selecting a gameplay mode may cause a game initialization user interface 412 to be displayed on the display 304 of the electronic device, an example of which is shown in FIG. 9. The initial user interface 412 may include an icon/frame 414 that should be aligned with a game participant that will be air drawing with the trackable drawing device 100 to act as an "artist" (e.g., participant P1 from FIG. 8). The initial user interface 412 may also include a button 416 that a participant operating the electronic device 302 (e.g., guessing participant P1 from FIG. 8) can actuate (e.g., press or click) when the artist is framed within the icon/frame 414. For clarity, the words "frame the next player and press READY to get started" may also appear on the initial user interface 412 (and the button 416 may be labeled "READY"). Providing this initial user interface 414 may decrease processing associated with initially locating the drawing device 100 and may also ensure that users are properly positioned to begin a game.

If method 400 begins at 410, the game application 300 continually causes the electronic device 302 to try to locate the drawing device 100 until the drawing device 100 is located (e.g., until a red light emitted by the illumination source 160 is seen in a 3 by 3 pixel of the images/video of the front-facing camera). Once the red light of the drawing device 100 is detected, based on the location thereof, the electronic device identifies generally where the drawing device 100 is located and starts to focus on that area. The logic then tracks the movement of the red light in the field of view of the electronic device. As the red light moves and is detected, the logic also uses the detected path of the red light to predict the general locations for upcoming movement of the red light so the program has an estimate as to where the red light will be.

Then, the game application 300 causes the electronic device 302 to scan for an indication of active drawing (in images/video captured by front-facing camera 335) at 420. The electronic device 302 continuously scans for a change in the color of the light from red to green. If the electronic device 302 does not detect the color change after tracking the red light for a period of time, then the electronic device 302 stops detected and the game play is not launched. When a user pushes drawing button 130, the color of the light emitted by the drawing device 100 changes from red to green. That color change is in indication to the electronic device 100 that it should continue to track movement of the light and start tracing the path of the light on the display of the electronic device, thereby simulating drawing, as discussed in greater detail below.

However, in some embodiments, the drawing device 100 need not be located in and of itself. Instead, at the start of gameplay, the game application 300 may cause the electronic device 302 to begin scanning for an indication of active air drawing at 420 (e.g., within the frame 414 shown in FIG. 9). Consequently, step 410 is shown in dashed lines.

If, at 430, the electronic device 302 determines that an indication of active drawing is detected, the game application 300 causes the electronic device 302 to begin creating a digital drawing on the display 304 of the electronic device 302 at 440, as is described in further detail below. For example, in FIG. 10, the drawing device 100 is emitting light of a specific frequency (e.g., green light) to create an active indicator 422 and upon detecting this active indicator 422, the electronic device 302 begins creating a digital drawing 444 on the display 304 of the electronic device 302 based on movements of the indicator 422 (the green light) by tracing the movement of the indicator 422 on the display 304.

As discussed above, in at least some embodiments, the game application 300 causes the electronic device 302 to constantly track the drawing device (e.g., based on a light of a first frequency, such as a red light, detected at 410), even if the active indicator 422 is not currently active. This may minimize processing associated with rendering a digital representation of an air drawing when the active indicator is activated (e.g., illuminated). That is, in at least some embodiments, the application 300 may cause the electronic device 302 to track all movements of the drawing device 100, but only generate digital drawings representative of the tracked movement when the drawing device 100 is emitting a specific frequency of light (i.e., when button 130 is actuated). This allows the first game participant P1 (who is acting as the artist) to choose when the air drawing is active.

Regardless of whether the drawing device 100 is continually tracked, due to the feedback loop between 430 and 440, the electronic device 302 checks if the indication of active drawing is still detected at 430 while creating the digital drawing at 440. This check may occur continually or periodically (e.g., at predetermined millisecond intervals). If, at 430, it is determined that the indication of active drawing is no longer detected (e.g., active indicator 422 is no longer detected), the game application 300 may cause initiation of a timeout timer at 432. For example, if a specific frequency of light (e.g., green light) is no longer detected in images/video captured by the front-facing camera 335, the game application 300 may cause imitation of a timeout timer at 432.

Then, depending on whether the timeout timer is determined to be above or below a threshold at 435, the game application 300 may cause the electronic device 302 to re-scan for the indication of active air drawing (e.g., active indicator 422) at 420 or re-locate the drawing device 100 at 430, respectively. Alternatively, if method 400 begins at 420 (and does not include step 410) or continually tracks the drawing device 100, the game application 300 may cause the electronic device 302 to re-scan for the indication of active air drawing (e.g., active indicator 422) at 420 regardless of whether the timeout timer is above or below a threshold (as is represented by the dashed line extending from the "No" decision of 435).

As a more specific example, if at 435, the electronic device 302 determines that the indication of active drawing (e.g., active indicator 422) has not been detected for an amount of time less than a threshold (e.g., less than 1 second), the game application 300 may assume the active indicator 422 (e.g., green light) was inadvertently moved out of the FOV of the front-facing camera 335 and may try to re-locate the active indicator 422. On the other hand, if the indication of active drawing (e.g., active indicator 422) has not been detected for an amount of time greater than a threshold (e.g., over 1 second), the game application 300 may assume the active indicator 422 was intentionally turned off and may try to relocate the drawing device 100 (or keep tracking the drawing device 100 with the understanding that it is off). In at least some embodiments, the threshold may be a predetermined threshold, such as one second. Additionally or alternatively, the threshold may be a variable threshold that varies based on tracking or vectoring algorithms that might recognize or predict when the drawing device 100 is still in the FOV (and, thus, likely to have been deactivated intentionally) and/or likely to move beyond the FOV of the front-facing camera 335 (e.g., based on the active indicator 422 being disposed at or being moved toward a boundary of the FOV) and adjust the threshold accordingly.

Figure 10:
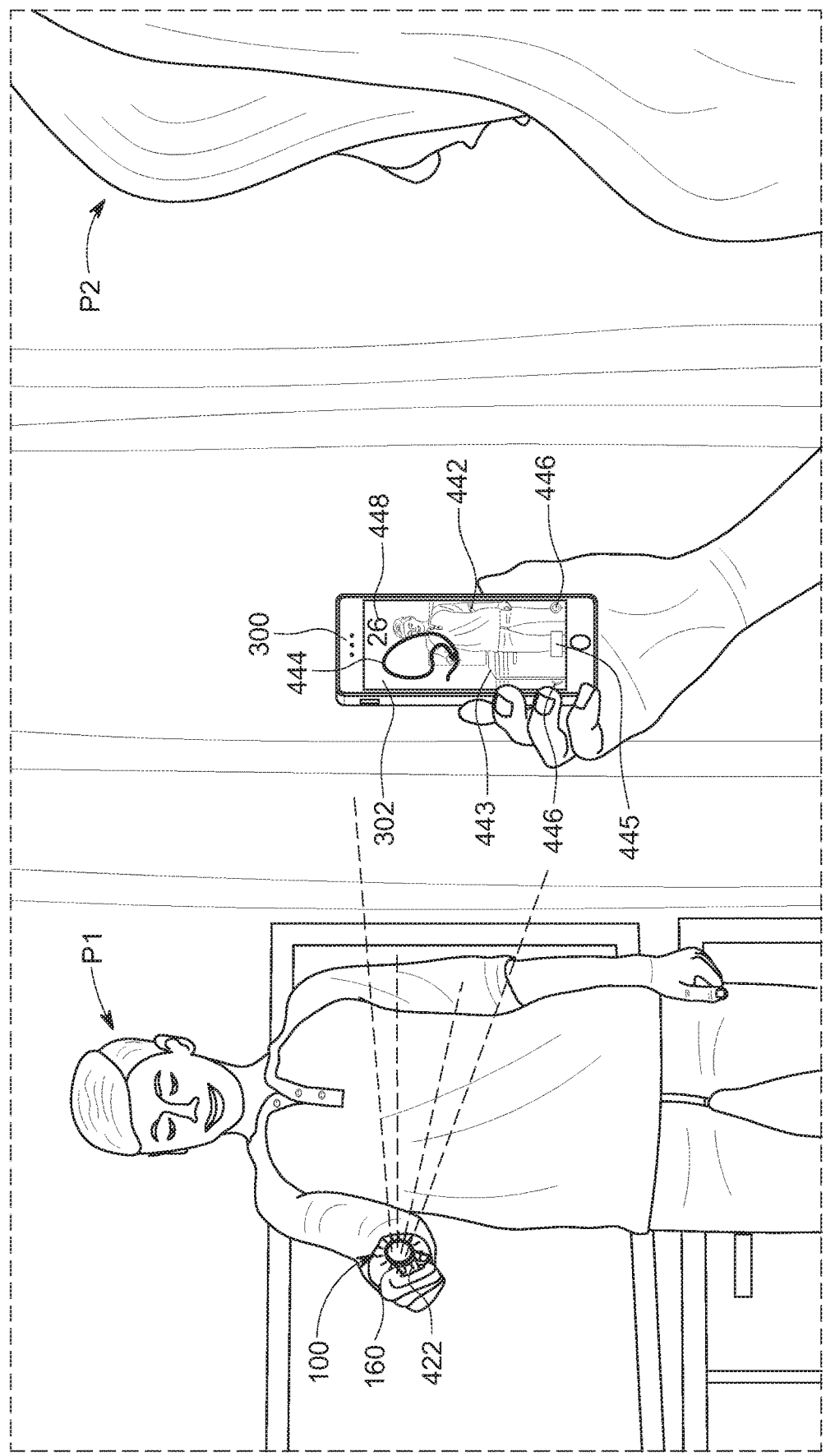
FIG. 10 is an illustration of game participants utilizing the trackable drawing device and game application of FIG. 1 to play the skills game of FIG. 1, according to an example embodiment. The illustration shows a gameplay user interface that the application may cause an electronic device to display during gameplay of the skills game, according to an example embodiment.
Figure 11:
FIG. 11 is an illustration of the gameplay user interface of FIG. 10 during gameplay of the skills game presented herein, according to an example embodiment.
Figure 12:
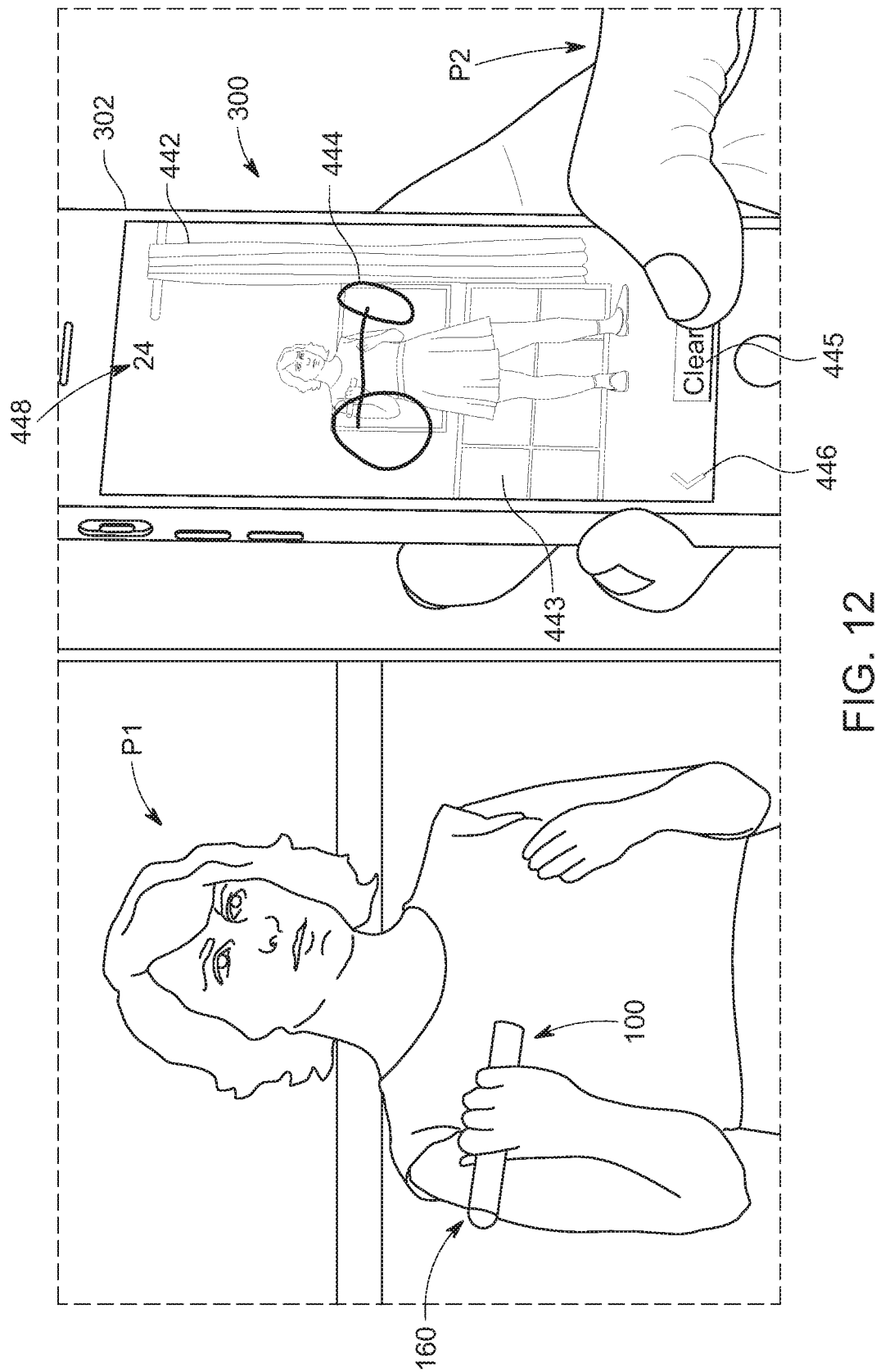
FIG. 12 illustrates the gameplay user interface of FIG. 10 during gameplay of the skills game presented herein alongside a drawing participant holding the trackable drawing device of FIG. 1, according to an example embodiment.

As is shown in FIGS. 10-12, when game application 300 causes the electronic device to create a digital drawing at 440 (e.g., after the electronic device 302 detects the indication of active drawing, such as light of a specific frequency (e.g., green light) being emitted by illumination source 160 at 420/430), the game application 300 causes the electronic device 302 to display a gameplay interface 442 on the display 304 of the electronic device 302. The gameplay interface 442 renders the digital drawing 444 atop of a background 443. Notably, in FIGS. 10 and 11, the artist participant P1 has activated the drawing device (e.g., by pressing button 130) and, thus, active indicator 422 is visible and the drawing 444 is being created. By comparison, in FIG. 12, the artist participant P1 is not activating the drawing device (e.g., by releasing button 130) and active indicator 422 is not visible. Instead, in FIG. 12, artist participant P1 is leveraging the augmented reality presentation of their drawing 444 and interacting with their drawing 444 in order to try to help the guessing participants P2 guess the clue 214 that the artist participant has air drawn.

In the depicted embodiments, the background 443 is a real-time feed from the front-facing camera 335 so that the drawing 444 overlays a real-time video feed of the game participant acting as the artist (e.g., game participant P1) and maps the digital drawing to the location of the game participant acting as the artist in the live-video feed. That is, in the depicted embodiment, the gameplay interface 442 provides an augmented reality experience. However, in other embodiments, the background 443 need not create an augmented reality experience and, instead, can comprise any desirable background.

Additionally, through gameplay interface 442, a game participant may view a timer, a score of a game, or any other relevant gameplay information (including digital clue cards and any features discussed above in connection with the example game modes). Moreover, a game participant may input various inputs through gameplay interface 442 related to game features or gameplay (e.g., erase commands, correct answer indications, etc.). For example, in the depicted embodiments, the gameplay interface 442 includes a number of buttons and indicia that facilitate gameplay. The buttons include a clear/erase button 445 that allows a game participant viewing the gameplay interface 442 to clear any digital drawings 444 shown in the gameplay interface 442 (e.g., any drawings rendered on the display 304 of the electronic display 304) so that the artist can start a new drawing from scratch. The gameplay interface 442 also includes gameplay/navigation buttons 446 that allow a user to navigate through the game application 300 and/or input a specific gameplay input, such as an input that indicates the guessing participants have correctly guessed the clue 214 that the artist was trying to suggest with his or her air drawings. Meanwhile, the gameplay interface 442 may also include a timer 448 and a score indicator 449 (see FIG. 11).

That all being said, the gameplay interfaces shown in FIGS. 10-12 are merely examples and in different embodiments and/or different gameplay modes, the gameplay interface 442 may display different combinations of buttons and indicia with any background 443 and still generate digital drawing 444. For example, when the skills game 10 is being played in a blitz mode, the gameplay interface 442 may display a round score (e.g., between 0-5) and an overall score. By comparison, when the skills game 10 is being played in a showdown mode, the gameplay interface 442 may display a round timer (e.g., counting down from thirty seconds) and an overall timer (e.g., showing time remaining in the overall five minutes allotted to a team). Additionally, in some embodiments, the game application 300 can cause the electronic device 302 to play music and/or sound effects (e.g., a buzzer at the expiration of a timer) and/or receive input from a rear-facing camera 330 and/or microphone 340. For example, the game application 300 could listen for a participant guessing a correct clue and automatically generate inputs instead of requiring guessing participants to input an indication of a correct guess through buttons of the gameplay user interface.

Figure 13:
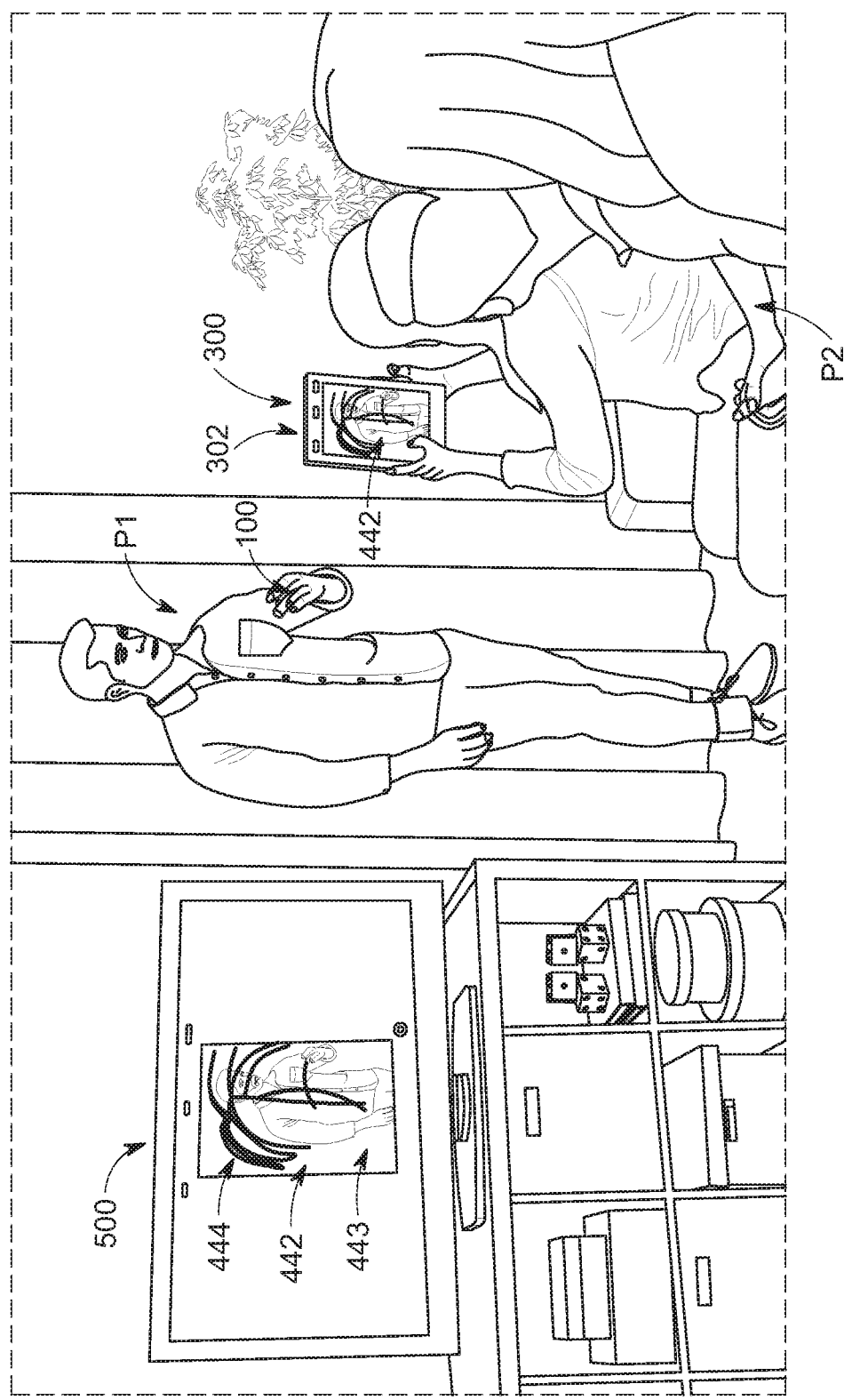
FIG. 13 is an illustration of the game participants from FIG. 7 utilizing a tablet that is executing the game application of FIG. 1 in order to play the skills game presented herein. The tablet is wirelessly linked to a remote display.

Now referring to FIG. 13, but with reference to FIGS. 8-12 as well, overall, the game application 300 enables one or more guessing participants to look at an electronic device 302 (e.g., participants P2 in FIG. 13) and see a digital representation of an air drawing drawn by a game participant P1 holding the drawing device 100. Based on the digital representation, the guessing participants P2 can begin guessing the clue (e.g., clue 214 from FIG. 1) that the air drawing is intended to evoke. However, sometimes it may be difficult for multiple guessing participants to see the display 304 of one electronic device 302.

Consequently, in at least some embodiments, the game application 300 may, in response to user inputs, cause the electronic device 302 to mirror or transmit an image of the gameplay interface 442 to a remote display 500, such as a television, so that multiple guessing participants P2 can easily see the digital representation 444 of an air drawing and the background 443 (e.g., an augmented reality background). That is, in at least some embodiments, the application may leverage screen-sharing technology, such as CHROMECAST, by GOOGLE of Mountainview, Calif., to cast an interface of the game application 300 to a television or other such display device and facilitate large group play. Additionally or alternatively, in some embodiments, one instance of game application 300 may be able to communicate with other instances applications 300 running on other electronic devices to synchronize or coordinate user interfaces for guessing participants playing the skills game 10 on the same team. Thus, for example, if one user on a first team presses the clear button 445 on their device 302, it may clear the drawing 444 from every device that is associated with the first team. The casting and or synchronization may be effectuated by components of the electronic device 302 on which an game application 300 is installed, such as communication module 370 (see FIG. 6B)

Figure 14:
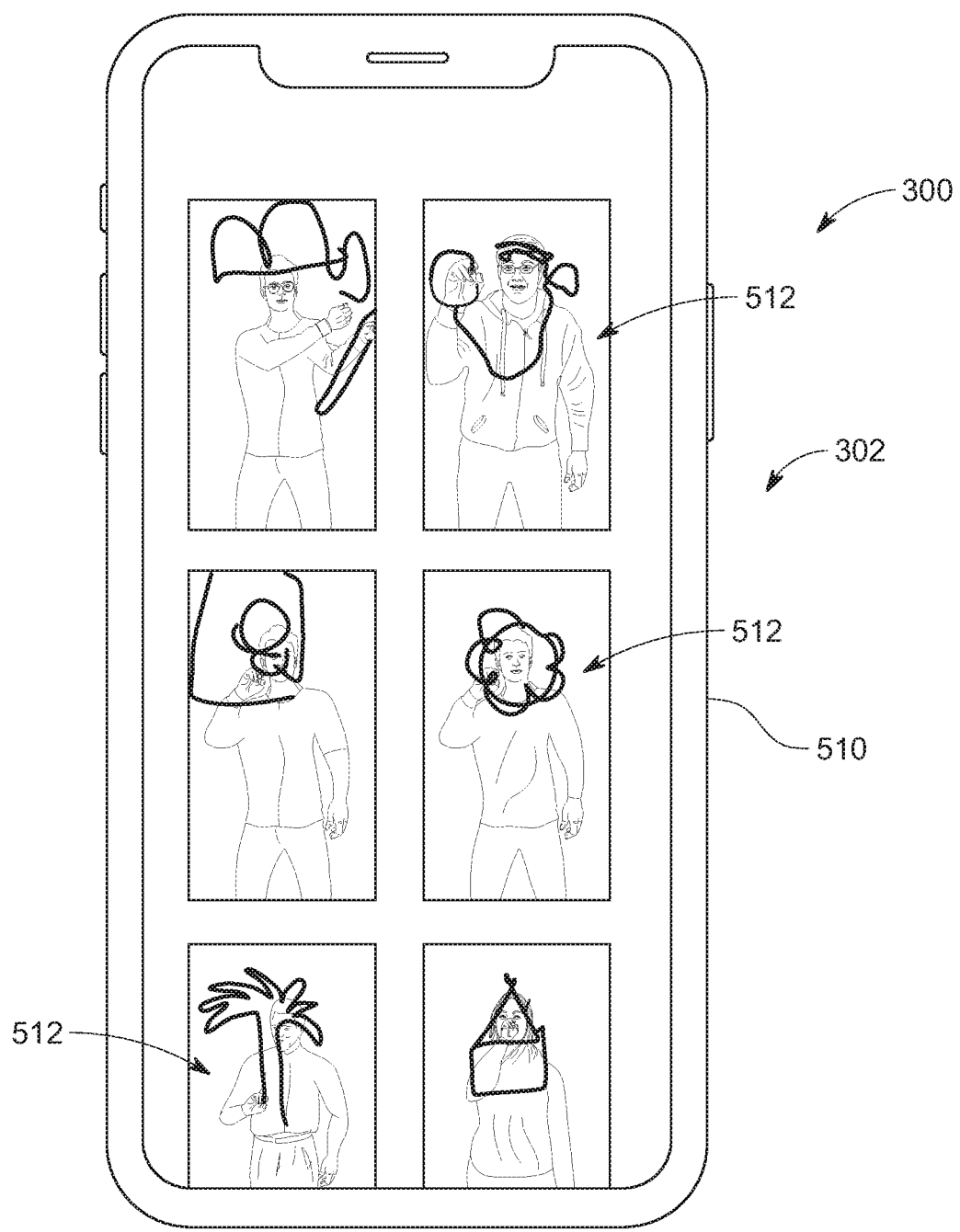
FIG. 14 is an illustration of a user interface that the game application of FIG. 1 may cause an electronic device to display subsequent to execution of the method of FIG. 8, according to an example embodiment.
Figure 15:
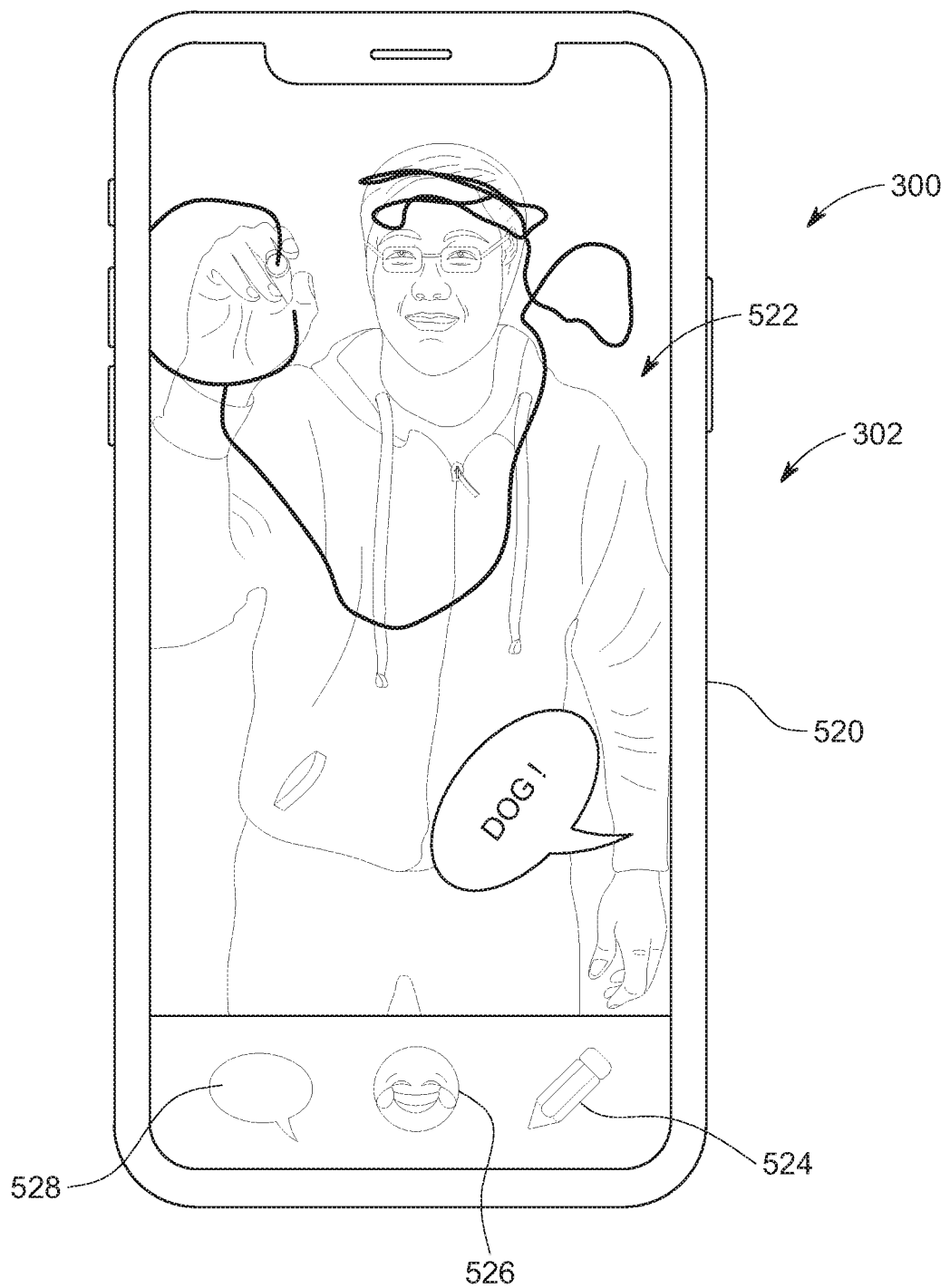
FIG. 15 is an illustration of a user interface that the game application of FIG. 1 may cause an electronic device to display subsequent to execution of the method of FIG. 8, according to an example embodiment.

Now turning to FIGS. 14 and 15, these Figures display user interfaces that may be presented to a user after gameplay to allow a user to re-watch, edit, share, or otherwise interact with recorded gameplay segments. To facilitate this interaction, the game application 300 may cause its host electronic device to record at least video data of gameplay. For example, the game application 300 may record a copy of data displayed on the gameplay interface 412 during gameplay. The recorded segments will include at least visual data that shows the digital drawing 444 and the background 443 (e.g., an augmented reality background) and in some embodiments may also record audio detected during gameplay (e.g., by microphone 440) and/or actions of guessing participants P2 (e.g., recorded from rear-facing camera 330). After completing of a game, the game application 300 may allow users to review and/or save the recording. Saved recordings can be stored locally (e.g., in memory 360) or remotely (e.g., in a remote server or "the cloud").

As is shown in FIG. 14, once gameplay is complete, recorded segments may be presented to a user in the gallery interface 510. Data may be divided into the segments based on clues, turns, time, game mode, etc. and each segment may be represented by a thumbnail 512. When the user selects a thumbnail 512, the game application 300 may present an editing interface 520 that allows a user to edit the selected video segment. In the depicted embodiment, a user can edit a recorded segment by adding effects with brush button 524 (e.g., to retroactively edit a drawing, add emphasis or animation to lines of a drawing (e.g., sparkles, bubbles, etc.), etc.), by adding emojis with emoji button 526, or by adding comments with comment button 528. However, in other embodiments, a user may edit a recorded segment in any manner (e.g., with any stickers, text, etc.). After editing a segment (or without editing a segment), the user may share the video segment, via email, text, social media, or via any other platform or communication method.

In one embodiment, the app on the electronic device may have a setting that can be selected by a user to "melt" away the drawing.

The detection of the red and green lights by the electronic device is a way to establish identity and authenticity of the trackable drawing device. Only drawing devices that emit the particular color, such as green, can be detected by the program and used to "draw" on the display of the electronic device.

Although the disclosed inventions are illustrated and described herein as embodied in one or more specific examples, it is nevertheless not intended to be limited to the details shown, since various modifications and structural changes may be made therein without departing from the scope of the inventions. In addition, various features from one of the embodiments may be incorporated into another of the embodiments. Accordingly, it is appropriate that the invention be construed broadly and in a manner consistent with the scope of the disclosure.

Additionally, it is to be understood that terms such as "left," "right," "top," "bottom," "front," "end," "rear," "side," "height," "length," "width," "upper," "lower," "interior," "exterior," "inner," "outer" and the like as may be used herein, merely describe points or portions of reference and do not limit the present invention to any particular orientation or configuration. Further, terms such as "first," "second," "third," etc., merely identify one of a number of portions, components and/or points of reference as disclosed herein, and do not limit the present invention to any particular configuration or orientation.

What is claimed is:

1. A skills game, comprising:
   a trackable drawing device including one or more illumination sources configured to illuminate an illumination area of the trackable drawing device; and
   an electronic device configured to:
      track a location of the illumination area when the illumination area is illuminated at a specific frequency by the one or more illumination sources; and
      generate a drawing on a display of the electronic device based on tracking of the location.

2. The skills game of claim 1, wherein, in generating the drawing, the electronic device overlays the drawing onto a real-time video feed of the trackable drawing device.

3. The skills game of claim 1, wherein the skills game further comprises:
   a set of playing cards with words that suggest drawings for a game participant to air draw with the trackable drawing device.

4. The skills game of claim 1, wherein the electronic device is not physically, electrically, or operatively connected to the trackable drawing device.

5. The skills game of claim 1, wherein the drawing generated on the display of the electronic device is a viewable digital image of a picture that is air drawn with the trackable drawing device.

6. The skills game of claim 1, wherein the electronic device is a smartphone or tablet that includes the display on a first side and a front-facing camera on a second side, opposite the first side, and an application installed on the smartphone or tablet causes the smartphone or tablet to track the location of the illumination area and generate the drawing.

7. The skills game of claim 1, wherein the electronic device begins tracking the location of the illumination area after locating the trackable drawing device, receiving a user input, or a combination thereof.

8. The skills game of claim 1, wherein the trackable drawing device comprises:
a main body that extends from a first end to a second end; and
a translucent housing that extends from the first end to define the illumination area.

9. The skills game of claim 8, wherein the one or more illumination sources are disposed in the translucent housing and the trackable drawing device further comprises a diffuser configured to reflect light emitted by the one or more illumination sources towards the illumination area.

10. The skills game of claim 8, wherein the main body further comprises:
a drawing button disposed in a button indentation defined in a top of the main body; and
a corresponding indentation defined in a bottom of the main body so that the main body provides an ergonomic grip that naturally aligns a user's thumb with the drawing button when the user grasps the trackable drawing device.

11. A method comprising:
tracking, at an electronic device, a location of an illumination area of a trackable drawing device that is illuminated by one or more illumination sources when the illumination area is illuminated at a specific frequency by the one or more illumination sources; and
generating a drawing on a display of the electronic device based on the tracking.

12. The method of claim 11, wherein, the generating further comprises overlaying the drawing onto a real-time video feed of the trackable drawing device.

13. The method of claim 11, wherein the electronic device is not physically, electrically, or operatively connected to the trackable drawing device.

14. The method of claim 11, wherein the drawing generated on the display of the electronic device is a viewable digital image of a picture that is air drawn with the trackable drawing device.

15. The method of claim 11, wherein the tracking commences subsequent to locating the trackable drawing device, receiving a user input, or a combination thereof.

16. A non-transitory computer-readable storage media encoded with software comprising computer executable instructions and when the software is executed operable to:
track a location of an illumination area of a trackable drawing device that is illuminated by one or more illumination sources when the illumination area is illuminated at a specific frequency by the one or more illumination sources; and
generating a drawing on a display of an electronic device based on the tracking.

17. The non-transitory computer-readable storage media of claim 16, wherein, the instructions operable to generate the drawing further comprises instructions operable to overlay the drawing onto a real-time video feed of the trackable drawing device.

18. The non-transitory computer-readable storage media of claim 16, wherein the electronic device is not physically, electrically, or operatively connected to the trackable drawing device.

19. The non-transitory computer-readable storage media of claim 16, wherein the drawing generated on the display of the electronic device is a viewable digital image of a picture that is air drawn with the trackable drawing device.

20. The non-transitory computer-readable storage media of claim 16, wherein the instructions to commence are executed subsequent to locating the trackable drawing device, receiving a user input, or a combination thereof.

* * * * *